(12) United States Patent
Mu

(10) Patent No.: US 11,843,933 B2
(45) Date of Patent: Dec. 12, 2023

(54) PHYSICAL CHANNEL TRANSMISSION METHOD AND DEVICE FOR MTC SYSTEM, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 441 days.

(21) Appl. No.: 17/156,338

(22) Filed: Jan. 22, 2021

(65) Prior Publication Data

US 2021/0153004 A1 May 20, 2021

Related U.S. Application Data

(63) Continuation of application No. PCT/CN2018/097090, filed on Jul. 25, 2018.

(51) Int. Cl.
*H04W 8/24* (2009.01)
*H04W 4/70* (2018.01)
(Continued)

(52) U.S. Cl.
CPC .............. *H04W 8/24* (2013.01); *H04W 4/70* (2018.02); *H04W 8/08* (2013.01); *H04W 72/0446* (2013.01); *H04W 72/23* (2023.01)

(58) Field of Classification Search
CPC ... H04W 4/70; H04W 72/0446; H04W 72/23; H04W 72/51; H04W 8/08; H04W 8/24
(Continued)

(56) References Cited

U.S. PATENT DOCUMENTS 9,232,520 B2  1/2016  Lee et al.
9,629,140 B2  4/2017  Morioka
(Continued)

FOREIGN PATENT DOCUMENTS

CN    103684675 A    3/2014
CN    103716841 A    4/2014
(Continued)

OTHER PUBLICATIONS

International Search Report from the State Intellectual Property Office in corresponding International Application No. PCT/CN2018/098090, dated Feb. 27, 2019.
(Continued)

*Primary Examiner* — Robert J Lopata
(74) *Attorney, Agent, or Firm* — Finnegan, Henderson, Farabow, Garrett & Dunner, L.L.P.

(57) ABSTRACT

A method for physical channel transmission in a machine type communication (MTC) system, applied to a base station, and includes: acquiring user capability information of user equipment (UE); determining a user capability of the UE according to the user capability information, the user capability including: nonsupport for physical downlink channel transmission in along term evolution (LTE) control channel region of a subframe, or support for physical downlink channel transmission in the LTE control channel region of the subframe; and sending a physical downlink channel transmission to the UE according to a transmission type corresponding to the user capability.

20 Claims, 13 Drawing Sheets

(51) Int. Cl.
*H04W 8/08* (2009.01)
*H04W 72/0446* (2023.01)
*H04W 72/23* (2023.01)

(58) Field of Classification Search
USPC .................................................... 370/329
See application file for complete search history.

(56) References Cited

U.S. PATENT DOCUMENTS

| | | | |
|---|---|---|---|
| 10,117,238 B2 | 10/2018 | Morioka | |
| 2013/0121317 A1 | 5/2013 | Lee et al. | |
| 2014/0341141 A1 | 11/2014 | Nguyen et al. | |
| 2015/0201402 A1 | 7/2015 | Morioka | |
| 2017/0019911 A1 | 1/2017 | Rico Alvarino et al. | |
| 2017/0180086 A1 | 6/2017 | Xiong et al. | |
| 2017/0181140 A1 | 6/2017 | Morioka | |
| 2017/0373902 A1 | 12/2017 | Zhang et al. | |
| 2018/0014283 A1* | 1/2018 | You | H04L 5/0094 |
| 2018/0270634 A1* | 9/2018 | Kim | H04W 72/54 |
| 2018/0332566 A1* | 11/2018 | You | H04L 5/00 |
| 2019/0239241 A1 | 8/2019 | Rico Alvarino et al. | |
| 2020/0022163 A1* | 1/2020 | Rico Alvarino | H04L 1/0013 |
| 2020/0029302 A1* | 1/2020 | Cox | H04W 68/02 |
| 2020/0213066 A1* | 7/2020 | Ma | H04W 24/02 |
| 2021/0143947 A1* | 5/2021 | Mu | H04L 5/0094 |
| 2021/0204286 A1* | 7/2021 | Yang | H04L 1/16 |
| 2021/0250916 A1* | 8/2021 | Mu | H04L 5/0007 |
| 2022/0039069 A1* | 2/2022 | Fang | H04L 27/2602 |

FOREIGN PATENT DOCUMENTS

| | | |
|---|---|---|
| CN | 104604315 A | 5/2015 |
| CN | 104838613 A | 8/2015 |
| CN | 106160978 A | 11/2016 |
| CN | 107276723 A | 10/2017 |
| CN | 107534835 A | 1/2018 |
| CN | 107852292 A | 3/2018 |
| CN | 107852300 A | 3/2018 |
| CN | 108141299 A | 6/2018 |
| EP | 2869491 A1 | 5/2015 |
| KR | 20130040699 A | 4/2013 |
| WO | WO 2013009098 A2 | 1/2013 |
| WO | WO 2016/120462 A1 | 8/2016 |

OTHER PUBLICATIONS

Written Opinion of International Searching Authority from the State Intellectual Property Office in corresponding International Application No. PCT/CN2018/098090 dated Feb. 27, 2019.
La Jolla, "New WID on Rel-16 MTC enhancements for LTE", 3GPP TSG RAN Meeting #80, RP-181335, La Jolla, USA, Jun. 11-14, 2018, 3 pages.
Extended European Search Report in European Application No. 18927317.0, dated Jun. 15, 2021.
Huawei, HiSilicon, On MPDCCH order identification in CE Mode B, 3GPP TSG RAN WG1 Meeting #84bis, R1-162593, Busan, Korea, Apr. 11-15, 2016, 7 pages.
Sony, "Performance Comparison of NC-PDCCH and ePDCCH", 3GPP TSG-RAN WG1 Meeting #80, R1-150634, Athens, Greece, Feb. 9-13, 2015, 3 pages.

* cited by examiner

PHYSICAL CHANNEL TRANSMISSION METHOD AND DEVICE FOR MTC SYSTEM, AND STORAGE MEDIUM

CROSS-REFERENCE TO RELATED APPLICATIONS

This application is a continuation of International Application No. PCT/CN2018/097090, filed on Jul. 25, 2018, the content of which is incorporated herein by reference in its entirety.

TECHNICAL FIELD

The present disclosure generally relates to the technical field of communication, and particularly, to a method and device for physical channel transmission in a Machine Type Communication (MTC) system and a storage medium.

BACKGROUND

Machine Type Communication (MTC) refers to human-intervention-free communication between machines, and has been applied widely to many technical fields, such as smart city (for example, meter reading), intelligent agriculture (for example, collection of temperature and humidity information, etc.), intelligent transportation (for example, bicycle sharing/car sharing) and the like. At present, a basic MTC communication framework is formed in a long term evolution (LTE) system (mainly in release 12 to release 13), and has the characteristics of low complexity, low construction cost, coverage enhancement, power saving and the like. A conventional MTC system is deployed in a frequency band of an LTE system (called an in-hand MTC system for short) and shares frequency resources and part of channels with users of the conventional LTE system. Since an in-band MTC system is deployed in an LTE frequency hand, coexistence with an existing LTE channel may be a concern in terms of resource mapping. For resource mapping of an MTC downlink channel such as an MTC physical downlink control channel (MPDCCH) and an MTC physical downlink shared channel (MPDSCH), it may be a major concern that mapping in an existing LTE channel region, usually physical resources occupied by first three Orthogonal Frequency Division Multiplexing (OFDM) symbols of a subframe, should be avoided.

However, as the present MTC system may be required to be deployed based on the LTE system, which lacks flexibility, the industry had begun to consider standalone MTC systems since release 16, for example, allocation of independent spectrums and dedicated channels/signals to the standalone MTC systems. Since a standalone MTC is independent of the UTE system, it is unnecessary to consider the problem of coexistence with another channel of the LTE system. Therefore, in a standalone mode, MPDCCHs and MPDSCHs of users of release-16 MTC systems (or users of part of release-16 MTC systems) support use of LTE control channel regions. However, there may still be user equipment (UE) that does not support use of LTE control channel regions, such as UE of previous releases. Therefore, during transmission of a physical downlink channel such as an MPDCCH and an MPDSCH, how to determine whether to use an LTE control channel region of a subframe is a problem to be solved at present.

SUMMARY

According to a first aspect of embodiments of the present disclosure, a method for physical channel transmission in an MTC system is provided. The method may be applied to a base station, and includes: acquiring user capability information of user equipment (UE); determining a user capability of the UE according to the user capability information, the user capability comprising: nonsupport for physical downlink channel transmission in a long term evolution (LTE) control channel region of a subframe, or support for physical downlink channel transmission in the LTE control channel region of the subframe; and sending a physical downlink channel transmission to the UE according to a transmission type corresponding to the user capability, the transmission type comprising a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

According to a second aspect of the embodiments of the present disclosure, a method for physical channel transmission in an MTC system is provided. The method may be applied to UE, and includes: reporting user capability information of the UE to a base station, the user capability information indicating a user capability of the UE, wherein the user capability comprises: nonsupport for physical downlink channel transmission in a long term evolution (LTE) control channel region of a subframe, or support for physical downlink channel transmission in the LTE control channel region of the subframe; and receiving a physical downlink channel transmission sent by the base station, a transmission type of the physical downlink channel transmission corresponding to the user capability, and the transmission type comprising a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

According to a third aspect of the embodiments of the present disclosure, a base station for use in an MTC system is provided. The base station may include: a processor, and a memory configured to store instructions executable by the processor, wherein the processor is configured to: acquire user capability information of user equipment (UE), determine a user capability of the UE according to the user capability information, the user capability comprising: nonsupport for physical downlink channel transmission in a long term evolution (LTE) control channel region of a subframe, or support for physical downlink channel transmission in the LTE control channel region of the subframe; and send a physical downlink channel transmission to the UE according to a transmission type corresponding to the user capability, the transmission type comprising a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

According to a fourth aspect of the embodiments of the present disclosure, user equipment (UE) for use in an MTC system is provided. The UE may include: a processor; and a memory configured to store instructions executable by the processor, wherein the processor is configured to: report user capability information of the UE to a base station, the user capability information indicating a user capability of the UE, wherein the user capability comprises: nonsupport for physical downlink channel transmission in a long term evolution (LTE) control channel region of a subframe, or support for physical downlink channel transmission in the LTE control channel region of the subframe; and receive a physical downlink channel transmission sent by the base station, a transmission type of the physical downlink channel transmission corresponding to the user capability and the transmission type comprising a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

According to a fifth aspect of the embodiments of the present disclosure, a non-transitory computer-readable storage medium having instructions stored thereon is provided. The instructions, when executed by a processor of a base station, cause the base station to perform the method for physical channel transmission in an MTC system according to the first aspect.

According to a sixth aspect of the embodiments of the present disclosure, a non-transitory computer-readable storage medium having instructions stored thereon is provided. The instructions, when executed by a processor of LTE, cause the UE to perform the method for physical channel transmission in an MTC system according to the second aspect.

The technical solutions provided in the embodiments of the present disclosure may have the following beneficial effects.

In the technical solutions provided in the embodiments of the present disclosure, the UE reports the user capability information of the UE to the base station, the user capability information indicating the user capability of the UE, wherein the user capability includes nonsupport for physical downlink channel transmission in the LTE control channel region of the subframe, or support for physical downlink channel transmission in the LTE control channel region of the subframe. The base station, after acquiring the user capability information of the UE, determines the user capability of the UE according to the user capability information to send the physical downlink channel transmission to the UE according to the transmission type corresponding to the user capability, the transmission type including the transmission type 1 for physical downlink channel transmission or the transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe. The UE receives the physical downlink channel transmission sent by the base station according to the transmission type corresponding to the user capability. Therefore, the present disclosure provides a mechanism for physical downlink channel transmission for an MTC system, which can notify the base station of whether the UE that accesses the MTC system has a capability of implementing physical downlink channel transmission by use of the LTE control channel region of the subframe, so as to enable the base station to explicitly determine whether to occupy the LTE control channel region of the subframe for subsequent transmission of the physical downlink channel transmission.

It is to be understood that the above general description and detailed description below are only exemplary and explanatory and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Embodiments of the present disclosure provide a method for physical channel transmission in an MTC system. The MTC system may be standalone. For the standalone MTC system, independent spectra and dedicated channels and signals may be configured. For example, a physical channel of the MTC system may include an MPDCCH, an MPDSCH, an MTC Physical Uplink Control Channel (MPUCCH), and an MTC Physical Uplink Shared Channel (MPUSCH). The MPDCCH and the MPUCCH are usually used to transmit control information, and the MPDSCH and the MPUSCH are usually used to transmit data information. Also for example, the MTC system may perform transmission of physical downlink channels, i.e., the MPDCCH and the MPDSCH. On the other hand, for the standalone MTC system, occupation of an LTE control channel region of a subframe for transmission of MPDCCH and MPDSCH transmissions is supported. Not all UE has a capability of implementing physical downlink channel transmission by use of the LTE control channel region of the subframe. Therefore, in embodiments of the present disclosure, for UE with different capabilities, different types of physical downlink channel transmissions are sent. Based on the above application scenario, an access method for an MTC system is provided below.

Figure 1:
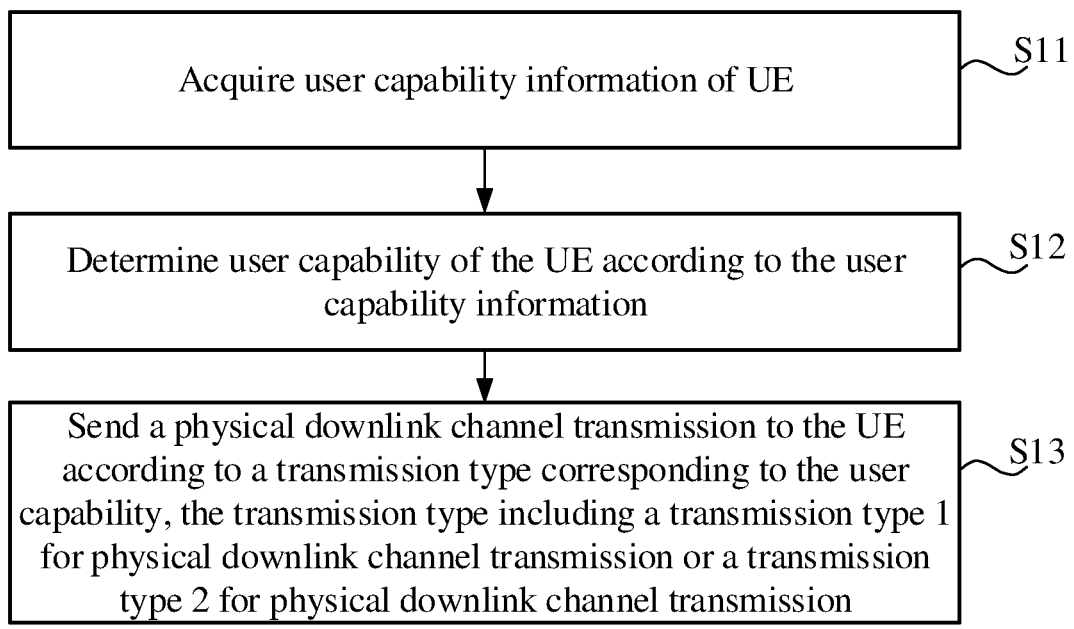
FIG. 1 is a flow chart showing a method for physical channel transmission in an MTC system, according to an exemplary embodiment.

FIG. 1 is a flow chart showing a method for physical channel transmission in an MTC system, according to an exemplary embodiment. The method is applied to a base station, and as shown in FIG. 1, may include the following steps.

In S11, user capability information of UE is acquired.

In an embodiment, the base station may receive the user capability information reported by the UE, or the base station may acquire the user capability information from a mobility management entity (MME). The MME, as a key control node of a 3rd Generation Partnership Project (3GPP) LTE access network, is responsible for positioning and paging processes, including relaying, of UE in an idle mode. The MME is responsible for signaling processing.

In S12, a user capability of the UE is determined according to the user capability information.

The user capability may include nonsupport for physical downlink channel transmission in a long term evolution (LTE) control channel region of a subframe, or support for physical downlink channel transmission in the LTE control channel region of the subframe. For example, UE that does not support use of the LTE control channel region of the subframe for physical downlink channel transmission may be referred to as first-capability UE, and UE that supports use of the LTE control channel region of the subframe for physical downlink channel transmission may be referred to as second-capability UE.

In an embodiment, for enabling the base station to identify whether UE in a random access process supports use of the LTE control channel region of the subfrarne for physical downlink channel transmission, the base station may require the second-capability UE to report a user capability, namely the UE should actively report its own user capability information when accessing a current MTC system if the UE is second-capability UE. If the UE is first-capability UE, the UE may not report its own user capability information, or, optionally, the UE may also report user capability information indicating that the UE does not support use of the LTE control channel region of the subframe for physical downlink channel transmission to the base station.

In S13, a physical downlink channel transmission is sent to the UE according to a transmission type corresponding to the user capability, the transmission type including a transmission type 1 for physical downlink channel transmission or a transmission type 2 for physical downlink channel transmission.

For the transmission type 1, the physical downlink channel transmission is not sent in the LTE control channel region of the subframe, and for the transmission type 2, the physical downlink channel transmission is sent in the LTE control channel region of the subframe. Since a physical downlink channel includes the abovementioned MPDCCH and MPDSCH, an MPDCCH transmission may be classified into a transmission type 1 of MPDCCH transmission and a transmission type 2 of MPDCCH transmission, and an MPDSCH transmission may be classified into a transmission type 1 of MPDSCH transmission and a transmission type 2 of MPDSCH transmission. The transmission type 1 of MPDCCH transmission and the transmission type 1 of MPDSCH transmission do not occupy the LTE control channel region of the subframe, and the transmission type 2 of MPDCCH transmission and the transmission type 2 of MPDSCH transmission occupy the LTE control channel region of the subframe.

Therefore, when the physical downlink channel transmission such as the MPDCCH transmission (or the MPDSCH transmission) is sent to the UE, whether to send the type 1 or transmission type 2 of MPDCCH transmission (or MPDSCH transmission) may be determined according to the user capability of the UE. For example, when the UE is second-capability UE, the transmission type 2 of MPDCCH transmission is sent, and when the UE is first-capability UE, the transmission type 1 of MPDCCH transmission is sent.

In the technical solution, a mechanism for physical downlink channel transmission for an MTC system is provided, which can notify the base station of whether the UE that accesses the current MTC system has a capability of implementing physical downlink channel transmission by use of the LTE control channel region of the subframe, so as to enable the base station to definitely determine whether to occupy the LTE control channel region of the subframe for subsequent transmission of the physical downlink channel transmission.

Figure 2:
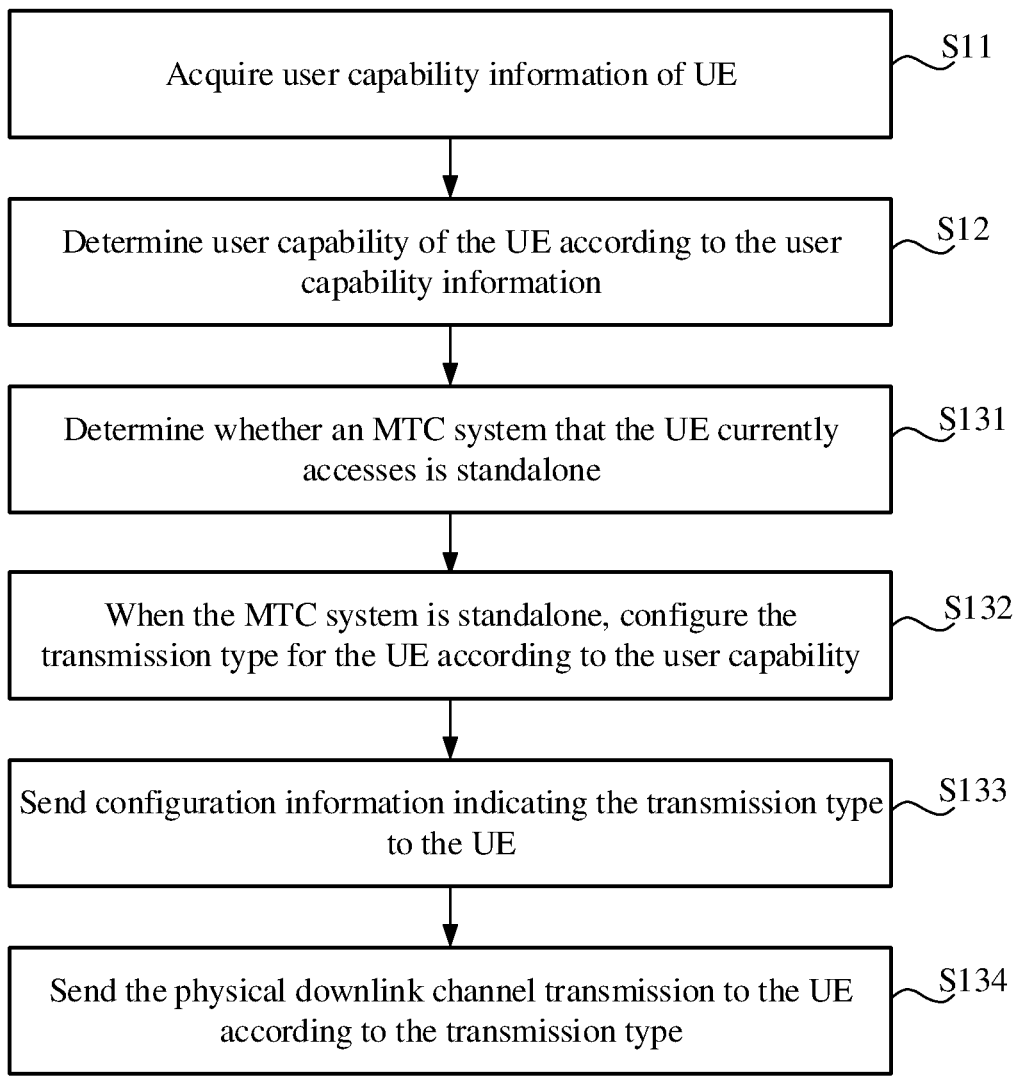
FIG. 2 is a flow chart showing another method for physical channel transmission in an MTC system, according to an exemplary embodiment.

FIG. 2 is a flow chart showing a method for physical channel transmission in an MTC system, according to an exemplary embodiment. The method is applied to a base station. As shown in FIG. 2, the operation in S13 (FIG. 1) that the physical downlink channel transmission is sent to the UE according to the transmission type corresponding to the user capability may include the following steps.

In S131, it is determined whether an MTC system that the UE currently accesses is standalone.

If the MTC system is not standalone, the MTC system is deployed in a frequency band of an LTE system, referred to hereafter as the in-band deployed MTC system. For the MTC system deployed in the frequency band of the LTE system, a control channel region of the LTE system usually occupies first three OFDM symbols of a subframe, so the in-band deployed MTC system does not involve the problem of whether to use the LTE control channel region. Therefore, when the MTC system is standalone, Step 132 to S134 are executed, and when the MTC system is in-band deployed, S132 to S134 are not executed.

In S132, when the MTC system is standalone, the transmission type is configured for the UE according to the user capability.

The operation that the transmission type is configured for the UE according to the user capability may include the following operations: in response to that the user capability is nonsupport for physical downlink channel transmission in the LTE control channel region of the subframe, the transmission type is configured to be the transmission type 1 for physical downlink channel transmission; and in response to that the user capability is support for physical downlink channel transmission in the LTE control channel region of the subframe, the transmission type is configured to be the transmission type 2 for physical downlink channel transmission, Since the physical downlink channel includes the MPDCCH and the MPDSCH, independent configuration or joint configuration may be performed on the MPDCCH and the MPDSCH. Independent configuration may be that the MPDCCH and the MPDSCH are independently configured and the MPDCCH transmission and the MPDSCH may be of different types. Joint configuration may be that the MPDCCH and the MPDSCH may be configured at one time, namely the MPDCCH transmission and the MPDSCH transmission are of the same type. Therefore, configuring the transmission type to be the type 2 physical downlink channel in response to that the user capability is support for physical downlink channel transmission in the LTE control channel region of the subframe may include the following conditions.

For independent configuration, the following operations may be included: the MPDCCH transmission is configured to be the transmission type 1 of MPDCCH transmission, and the MPDSCH transmission is configured to be the transmission type 2 of MPDSCH transmission; or, the MPDCCH transmission is configured to be the transmission type 2 of MPDCCH transmission, and the MPDSCH transmission is configured to be the transmission type 1 of MPDSCH transmission.

For joint configuration, the following operations may be included: the MPDCCH transmission is configured to be the transmission type 2 of MPDCCH transmission, and the MPDSCH transmission is configured to be the transmission type 2 of MPDSCH transmission; or, the MPDCCH transmission is configured to be the transmission type 1 of MPDCCH transmission, and the MPDSCH transmission is configured to be the transmission type 1 of MPDSCH transmission.

That is, when the user capability is support for physical downlink channel transmission in the LTE control channel region of the subframe, types of both the MPDCCH transmission and the MPDSCH transmission are configured to be type 2 to fully utilize the LTE control channel region of the subframe when the MPDCCH transmission and the MPDSCH transmission are subsequently transmitted, or, the type of at least one of the MPDCCH transmission and the MPDSCH transmission may still be set to be type 1 when necessary.

In S133, configuration information indicating the transmission type is sent to the UE.

In S134, the physical downlink channel transmission is sent to the UE according to the transmission type.

After the configuration in S132 is completed, the configuration information is sent to the UE to notify the types of the MPDCCH transmission and MPDSCH transmission that are subsequently transmitted, and then the MPDCCH transmission or the MPDSCH transmission is sent according to the type of the MPDCCH transmission or the type of the MPDSCH transmission configured in S132, such that the UE also receives the MPDCCH transmission or the MPDSCH transmission according to the type of the MPDCCH transmission or the type of the MPDSCH transmission configured in S132.

In addition, when the physical downlink channel transmission is to be sent, it is determined whether the physical downlink channel transmission to be sent is a dedicated message of the UE or a message shared among multiple UEs (including the UE). If the message to be sent is a dedicated message, the physical downlink channel transmission is sent according to the transmission type configured in S132. When the message to be sent is a shared message, the physical downlink channel transmission is still sent according to type 1.

For example, when the MPDCCH transmission or MPDSCH transmission to be sent is a dedicated message of the UE, such as a control message, data or service information to be sent to the UE, the MPDCCH transmission or the MPDSCH transmission is sent according to the type of the MPDCCH transmission or the type of the MPDSCH transmission configured in S132. However, when the MPDCCH transmission or MPDSCH transmission to be sent is a message shared among multiple UEs, such as a system message and a paging message, the MPDCCH transmission or the MPDSCH transmission may still be sent according to the transmission type 1 of MPDCCH transmission or the transmission type 1 of MPDSCH transmission.

Figure 3:
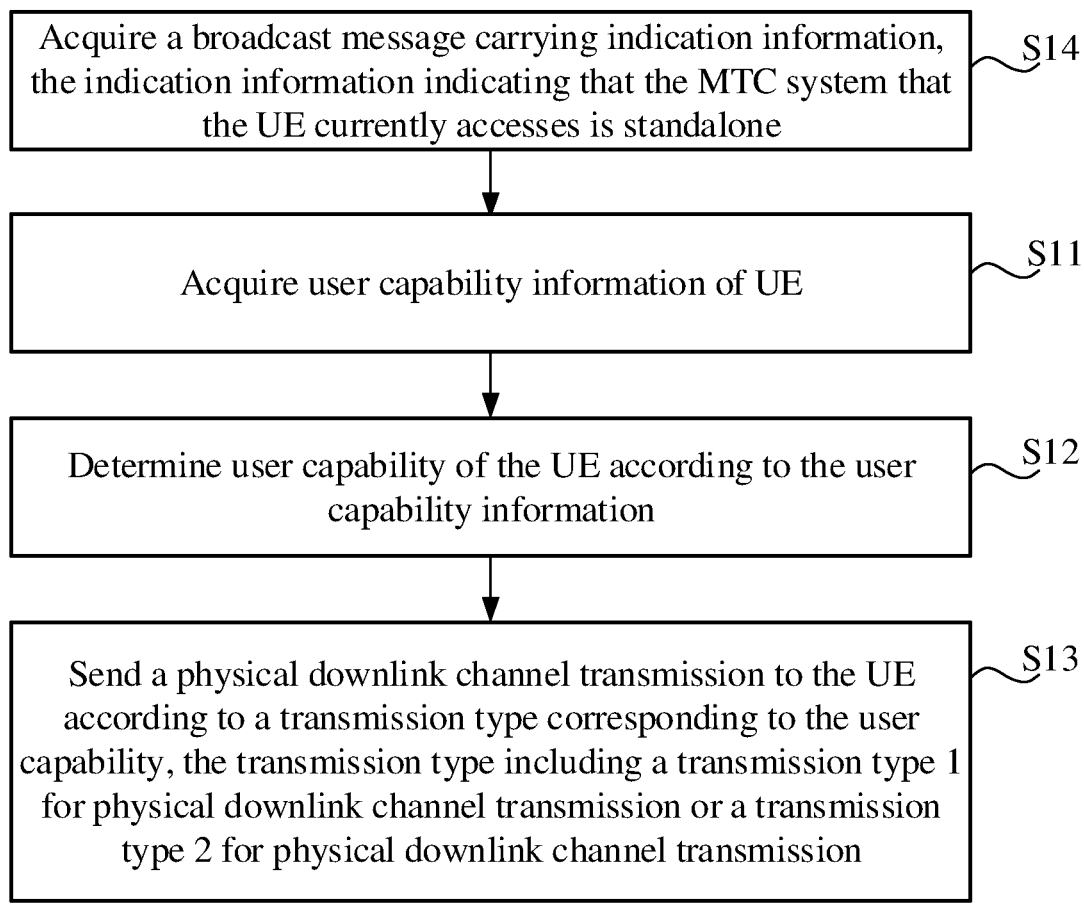
FIG. 3 is a flow chart showing another method for physical channel transmission in an MTC system, according to an exemplary embodiment.

In an embodiment, the base station may actively notify the UE that the currently accessed MTC system is standalone. FIG. 3 is a flow chart showing a method for physical channel transmission in an MTC system, according to an exemplary embodiment. The method is applied to a base station. As shown in FIG. 3, before S11, the method may further include the following step.

In S14, a broadcast message carrying indication information is sent, the indication information indicating that the MTC system that the UE currently accesses is standalone.

The broadcast message may be a Master Information Block (MIB), and the indication information may provide an indication through one or more spare bits of the MIB (also referred to as reserved bits). For example, one or more bits in spare bits may be occupied as flag bits indicating whether the MTC system is standalone. Or, the broadcast message may be a SIB.

Correspondingly, the operation in S11 that the user capability information of the UE is acquired may include that: the user capability information reported by the UE after receiving the broadcast message is acquired.

In an embodiment, since the physical downlink channel includes the MPDCCH and the MPDSCH, the operation in S13 that the physical downlink channel transmission is sent to the UE according to the transmission type corresponding to the user capability, the transmission type including the transmission type 1 for physical downlink channel transmission or the transmission type 2 for physical downlink channel transmission, may include the following implementation modes.

In a first mode, in response to that the user capability is support for physical downlink channel transmission in the LTE control channel region of the subframe, the transmission type 2 of MPDCCH transmission and the transmission type 2 of MPDSCH transmission are sent to the UE.

In a second mode, in response to that the user capability is support for physical downlink channel transmission in the LTE control channel region of the subframe, the MPDCCH transmission is configured to be the transmission type 2 of MPDCCH transmission, the MPDSCH transmission is configured to be the transmission type 2 of MPDSCH transmission, and after the MPDCCH transmission is configured to be the transmission type 2 of MPDCCH transmission and the MPDSCH transmission is configured to be the transmission type 2 of MPDSCH transmission, the transmission type 2 of MPDCCH transmission and the transmission type 2 of MPDSCH transmission are sent to the UE.

In a third mode, in response to that the user capability is support for physical downlink channel transmission in the LTE control channel region of the subframe, the transmission type 2 of MPDSCH transmission is sent to the UE, the MPDCCH transmission is configured to be the transmission type 2 of MPDCCH transmission, and after the MPDCCH transmission is configured to be the transmission type 2 of MPDCCH transmission, the transmission type 2 of MPDCCH transmission is sent to the UE.

Figure 4:
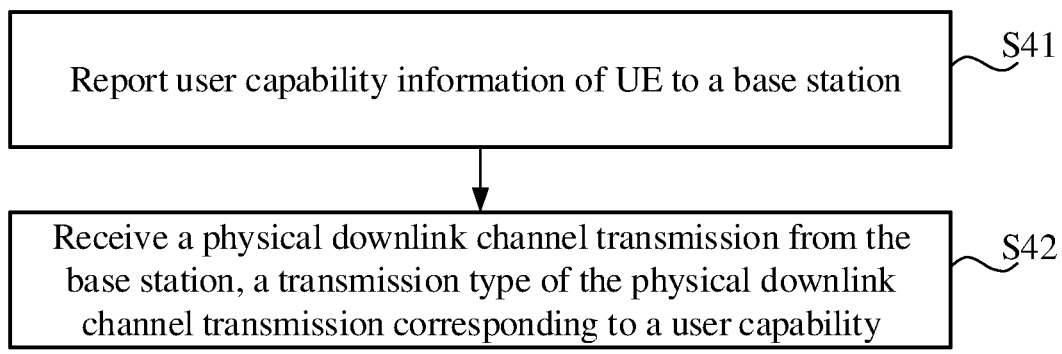
FIG. 4 is a flow chart showing another method for physical channel transmission in an MTC system, according to an exemplary embodiment.

FIG. 4 is a flow chart showing a method for physical channel transmission in an MTC system, according to an exemplary embodiment. The method is applied to UE. As shown in FIG. 4, the method may include the following steps.

In S41, user capability information of UE is reported to a base station.

The user capability information is used for determining a user capability of the UE, and the user capability may include nonsupport for physical downlink channel transmission in a long term evolution (LTE) control channel region of a subframe, or support for physical downlink channel transmission in the LTE control channel region of the subframe. For example, UE that does not support use of the LTE control channel region of the subframe for physical downlink channel transmission may be referred to as first-capability UE, and UE that supports use of the LTE control channel region of the subframe for physical downlink channel transmission may be referred to as second-capability UE. The base station may require second-capability UE to report a user capability, namely the UE should actively report its own user capability information when accessing a current MTC system if the UE is second-capability UE. If the UE is first-capability UE, the UE may not report its own user capability information, or, optionally, the UE may also report user capability information indicating that the UE does not support use of the LTE control channel region of the subframe for physical downlink channel transmission to the base station.

In S42, a physical downlink channel transmission sent by the base station is received, a transmission type of the physical downlink channel transmission corresponding to a user capability.

The transmission type may include a type 1 physical downlink channel or a type 2 physical downlink channel. The type 1 physical downlink channel is a physical downlink channel that does not occupy the LTE control channel region of the subframe, and the type 2 physical downlink channel is a physical downlink channel that occupies the LTE control channel region of the subframe. The physical downlink channel may include the abovementioned MPDCCH and MPDSCH. The type of an MPDCCH transmission and the type of an MPDSCH transmission may refer to the description in S13 and will not be repeated.

In the technical solution, a mechanism for physical downlink channel transmission for an MTC system is provided, which may notify the base station whether the UE that accesses the current MTC system has a capability of implementing physical downlink channel transmission by use of the LTE control channel region of the subframe to enable the base station to clearly determine whether to occupy the LTE control channel region of the subframe for subsequent transmission of the physical downlink channel transmission.

Figure 5:
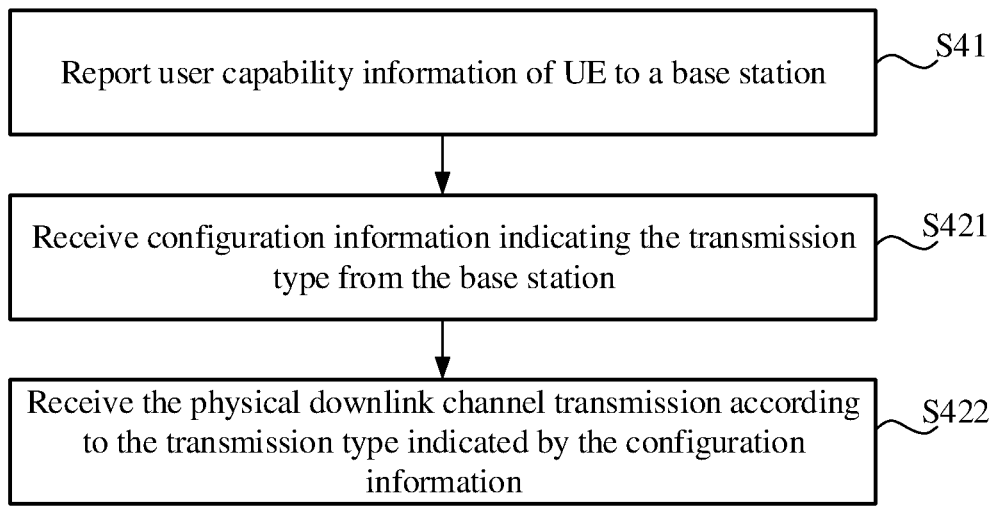
FIG. 5 is a flow chart showing another method for physical channel transmission in an MTC system, according to an exemplary embodiment.

FIG. 5 is a flow chart showing a method for physical channel transmission in an MTC system, according to an exemplary embodiment. The method is applied to UE. As shown in FIG. 5, the operation in S42 (FIG. 4) that the physical downlink channel transmission sent by the base station is received may include the following steps.

In S421, configuration information indicating the transmission type is received from the base station.

In S422, the physical downlink channel transmission is received according to the transmission type indicated by the configuration information.

According to different user capabilities indicated by the user capability information reported to the base station by different UEs, the transmission types indicated by the configuration information transmitted by the base station may be different. For example, the following conditions may be included: in response to that the user capability is nonsupport for physical downlink channel transmission in the LTE control channel region of the subframe, the configuration information includes that the transmission type is the type 1 physical downlink channel; and in response to that the user capability is support for physical downlink channel transmission in the LTE control channel region of the subframe, the configuration information includes that the transmission type is the type 2 physical downlink channel.

Since the physical downlink channel includes the MPDCCH and the MPDSCH, the base station may perform independent configuration or joint configuration on the MPDCCH and the MPDSCH. Independent configuration may be that the MPDCCH and the MPDSCH are independently configured and the MPDCCH transmission and the MPDSCH may be of different types. Joint configuration may be that the base station may configure the MPDCCH and the MPDSCH at one time, namely the MPDCCH transmission and the MPDSCH transmission are of the same type. Therefore, when the configuration information indicates that the transmission type is the type 2 physical downlink channel, the following conditions may be included.

For independent configuration, the following conditions may be included: the MPDCCH transmission is a transmission type 1 of MPDCCH transmission, and the MPDSCH transmission is a transmission type 2 of MPDSCH transmission; or, the MPDCCH transmission is a transmission type 2 of MPDCCH transmission, and the MPDSCH transmission is a transmission type 1 of MPDSCH transmission.

For joint configuration, the following conditions may be included: the MPDCCH transmission is the transmission type 2 of MPDCCH transmission, and the MPDSCH transmission is the transmission type 2 of MPDSCH transmission; or, the MPDCCH transmission is the transmission type 1 of MPDCCH transmission, and the MPDSCH transmission is the transmission type 1 of MPDSCH transmission.

That is, in response to that the user capability is support for physical downlink channel transmission in the LTE control channel region of the subframe, the base station may configure the types of both the MPDCCH transmission and the MPDSCH transmission to be type 2, to fully utilize the LTE control channel region of the subframe when the MPDCCH transmission and the MPDSCH transmission are subsequently transmitted, or, the base station may still configure the type of at least one of the MPDCCH transmission and the MPDSCH transmission to be type 1 when necessary.

The UE, after receiving the configuration information, may know the types of the MPDCCH transmission and MPDSCH transmission that are subsequently transmitted and then receive the MPDCCH transmission or the MPDSCH transmission according to the type of the MPDCCH transmission or the type of the MPDSCH transmission, indicated by the configuration information.

In addition, the base station, when sending the physical downlink channel transmission, may be required to determine whether the physical downlink channel transmission to be sent is a dedicated message of the UE or a message shared among multiple UEs (including the UE). When the physical downlink channel transmission is the dedicated message, the base station may send it according to the transmission type configured in S132. When the physical downlink channel transmission is the shared message, the base station still sends it according to type 1. Therefore, the UE, before receiving the physical downlink channel transmission, may also correspondingly determine whether the physical downlink channel transmission to be received is the dedicated message of the UE or the shared message. When the physical downlink channel transmission is the dedicated message, the UE receives it according to the transmission type indicated by the configuration information. When the physical downlink channel transmission is the shared message, the UE still receives it according to type 1.

For example, when the MPDCCH transmission or MPDSCH transmission to be received is a dedicated message of the UE, such as a control message, data or service information to be sent to the UE by the base station, the UE receives the MPDCCH transmission or the MPDSCH transmission according to the type of the MPDCCH transmission or the MPDSCH transmission in the configuration information. However, when the MPDCCH transmission or MPDSCH transmission to be sent by the base station is a shared message of multiple pieces of UE, such as a system message and a paging message, the UE may still receive the MPDCCH transmission or the MPDSCH transmission according to the transmission type 1 of MPDCCH transmission or the transmission type 1 of MPDSCH transmission.

Figure 6:
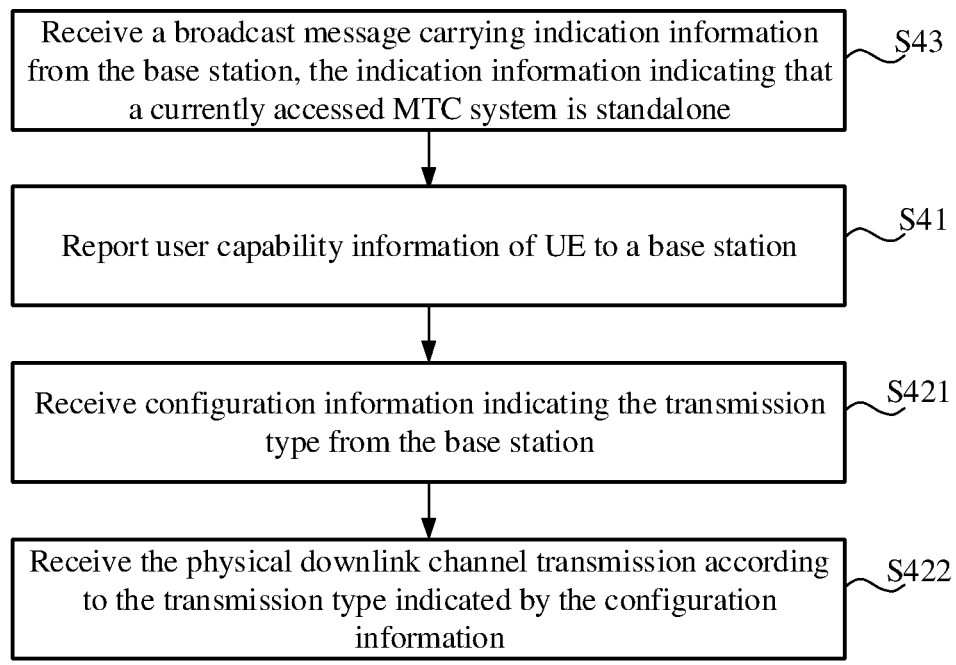
FIG. 6 is a flow chart showing another method for physical channel transmission in an MTC system, according to an exemplary embodiment.

In an embodiment, the base station may actively notify the UE that a currently accessed MTC system is standalone. FIG. 6 is a flow chart showing a method for physical channel transmission in an MTC system, according to an exemplary embodiment. The method is applied to UE. As shown in FIG. 6, before S41, the method may further include the following step.

In S43, a broadcast message carrying indication information is received from the base station, the indication information indicating that a currently accessed MTC system is standalone.

The broadcast message may be a MIB, and the indication information may provide an indication through one or more spare bits of the MIB (also referred to as reserved bits). For example, one or more bits in one or more spare bits may be occupied as flag bits indicating whether the MTC system is standalone. Or, the broadcast message may be an SIB.

Correspondingly, the operation in S41 that the user capability information of the UE is reported to the base station may include that: when it is determined according to the indication information in the broadcast message that the MTC system is standalone, the user capability information is reported to the base station.

In an embodiment, the physical downlink channel includes the MPDCCH and the MPDSCH. Accordingly, the operation in S42 (FIG. 4) that the physical downlink channel transmission sent by the base station is received, the transmission type of the physical downlink channel transmission corresponding to the user capability and the transmission type including the type 1 physical downlink channel or the type 2 physical downlink channel, may include the following implementation modes.

In a first mode, in response to that the user capability is support for physical downlink channel transmission in the LTE control channel region of the subframe, the transmission type 2 of MPDCCH transmission and transmission type 2 of MPDSCH transmission sent by the base station are received.

For example, it may be specified in advance in a protocol that, when the base station determines according to the received user capability information that the UE supports use of the LTE control channel region of the subframe for physical downlink channel transmission, the transmission type 2 of MPDCCH transmission and the transmission type 2 of MPDSCH transmission are directly sent to the UE. Therefore, correspondingly, when the UE supports use of the LTE control channel region of the subframe for physical downlink channel transmission, after reporting its own user capability information, the UE may consider that the subsequent MPDCCH transmission and MPDSCH transmission of the base station are the transmission type 2 of MPDCCH transmission and the transmission type 2 of MPDSCH transmission without waiting for an indication of the base station, and thus may directly receive the transmission type 2 of MPDCCH transmission and transmission type 2 of MPDSCH transmissions sent by the base station.

In a second mode: in response to that the user capability is support for physical downlink channel transmission in the LTE control channel region of the subframe, a first configuration message indicating that the MPDCCH transmission is to be configured to be the transmission type 2 of MPDCCH transmission and the MPDSCH transmission is to be configured to be the transmission type 2 of MPDSCH transmission is received from the base station, and after the first configuration message is received, the transmission type 2 of MPDCCH transmission and transmission type 2 of MPDSCH transmission sent by the base station are received.

In the embodiment, the base station, when determining according to the received user capability information that the LTE supports use of the LTE control channel region of the subframe for physical downlink channel transmission, may be required to configure the transmission types of the MPDCCH transmission and MPDSCH transmission that are subsequently sent at first, and send the first configuration message to the UE to notify the UE of the subsequent transmission type, such that the UE, after receiving the first configuration message, knows that the subsequent MPDCCH transmission and MPDSCH transmission are of type 2 and receives the transmission type 2 of MPDCCH transmission and transmission type 2 of MPDSCH transmission sent by the base station.

In a third mode, in response to that the user capability is support for physical downlink channel transmission in the LTE control channel region of the subframe, the transmission type 2 of MPDSCH transmission and a second configuration message indicating that the MPDCCH transmission is configured to be the transmission type 2 of MPDCCH transmission are received from the base station, and after the second configuration message is received, the transmission type 2 of MPDCCH transmission sent by the base station is received.

In the embodiment, the base station, when determining according to the received user capability information that the LTE supports use of the LTE control channel region of the subframe for physical downlink channel transmission, may directly send the transmission type 2 of MPDSCH transmission but may be required to configure the transmission type of the MPDCCH transmission that is subsequently transmitted, and thus the base station may send the transmission type 2 of MPDCCH transmission to the UE after sending the second configuration message to the UE. Correspondingly, the LTE, after reporting the user capability information, may directly receive the transmission type 2 of MPDSCH transmission sent by the base station and, after receiving the second configuration message and determining according to the second configuration message that the transmission type of the MPDCCH transmission that is subsequently transmitted is the type 2 MPDCCH, receives the transmission type 2 of MPDCCH transmission sent by the base station.

In the above embodiments, the UE reports the user capability information of the UE to the base station, the user capability information indicating the user capability of the UE, wherein the user capability includes nonsupport for physical downlink channel transmission in the LTE control channel region of the subframe or support for physical downlink channel transmission in the LTE control channel region of the subframe; and the base station, after acquiring the user capability information of the UE, determines the user capability of the UE according to the user capability information to send the physical downlink channel transmission to the UE according to the transmission type corresponding to the user capability, the transmission type including the transmission type 1 for physical downlink channel transmission or the transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe; and the UE receives the physical downlink channel transmission sent by the base station according to the transmission type corresponding to the user capability. Therefore, the present disclosure provides a mechanism for physical downlink channel transmission for an MTC system which may notify the base station of whether the UE that accesses the MTC system has a capability of implementing physical downlink channel transmission by use of the LTE control channel region of the subframe, so as to enable the base station to definitely determine whether to occupy the LTE control channel region of the subframe for subsequent transmission of the physical downlink channel transmission.

Figure 7:
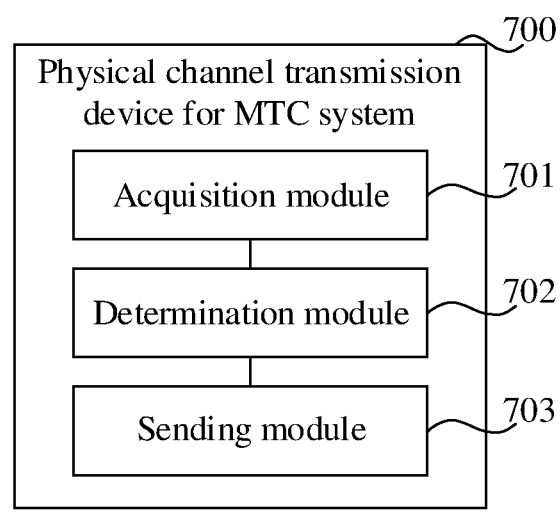
FIG. 7 is a block diagram of a device for physical channel transmission in an MTC system, according to an exemplary embodiment.

FIG. 7 is a block diagram of a device 700 for physical channel transmission in an MTC system, according to an exemplary embodiment. The device 700 is applied to a base station, and as shown in FIG. 7, may include an acquisition module 701, a determination module 702, and a sending module 703.

The acquisition module 701 is configured to acquire user capability information of UE;

The determination module 702 is configured to determine a user capability of the UE according to the user capability information, the user capability including: nonsupport for physical downlink channel transmission in an LTE control channel region of a subframe, or support for physical downlink channel transmission in the LTE control channel region of the subframe.

The sending module 703 is configured to send a physical downlink channel transmission to the UE according to a transmission type corresponding to the user capability, the transmission type including a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

Figure 8:
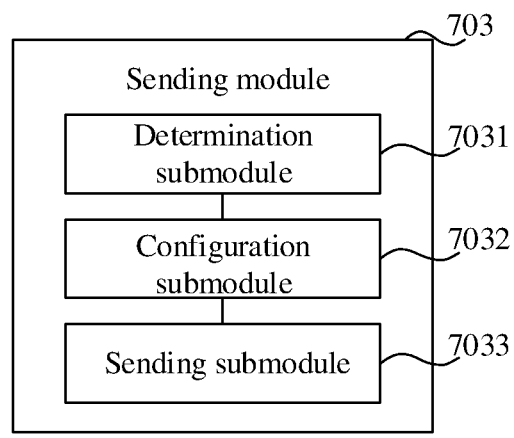
FIG. 8 is a block diagram of a sending module, according to an exemplary embodiment.

FIG. 8 is a block diagram of the sending module 703 (FIG. 7), according to an exemplary embodiment. As shown in FIG. 8, the sending module 703 may include: a determination submodule 7031 configured to determine whether an MTC system that the UE currently accesses is standalone; a configuration submodule 7032 configured to, when the MTC system is standalone, configure the transmission type for the UE according to the user capability; and a sending submodule 7033 configured to send configuration information indicating the transmission type to the UE, wherein the sending submodule 7033 is further configured to send the physical downlink channel transmission to the UE according to the transmission type.

In an embodiment, the sending submodule 7033 is configured to: in response to that the user capability is nonsupport for physical downlink channel transmission in the LTE control channel region of the subframe, configure the transmission type to be the transmission type 1 for physical downlink channel transmission; and in response to that the user capability is support for physical downlink channel transmission in the LTE control channel region of the subframe, configure the transmission type to be the transmission type 2 for physical downlink channel transmission.

In an embodiment, a physical downlink channel includes an MPDCCH and an MPDSCH; and the sending submodule 7033 may be configured to: in response to that the user capability is support for physical downlink channel transmission in the LTE control channel region of the subframe, configure an MPDCCH transmission to be a transmission type 1 of MPDCCH transmission and configure an MPDSCH transmission to be a transmission type 2 of MPDSCH transmission, or configure the MPDCCH transmission to be a transmission type 2 of MPDCCH transmission and configure the MPDSCH transmission to be a transmission type 1 of MPDSCH transmission, or configure the MPDCCH transmission to be the transmission type 2 of MPDCCH transmission and configure the MPDSCH transmission to be the transmission type 2 of MPDSCH transmission, or configure the MPDCCH transmission to be the transmission type 1 of MPDCCH transmission and configure the MPDSCH transmission to be the transmission type 1 of MPDSCH transmission.

In an embodiment, the acquisition module 701 is configured to: receive the user capability information reported by the UE; or acquire the user capability information from an MME.

In an embodiment, the sending module 703 may further be configured to send a broadcast message carrying indication information, the indication information indicating that the MTC system that the UE currently accesses is standalone; and correspondingly, the acquisition module 701 is configured to: acquire the user capability information reported by the UE after receiving the broadcast message. The broadcast message is a MIB, and the indication information provides an indication through one or more spare bits of the MIB; or, the broadcast message is a SIB.

In an embodiment, the physical downlink channel includes the MPDCCH and the MPDSCH; and the sending module 703 may be configured to: in response to that the user capability is support for physical downlink channel transmission in the LTE control channel region of the subframe, send the transmission type 2 of MPDCCH transmission and the transmission type 2 of MPDSCH transmission to the UE, or, in response to that the user capability is support for physical downlink channel transmission in the LTE control channel region of the subframe, configure the MPDCCH transmission to be the transmission type 2 of MPDCCH transmission, configure the MPDSCH transmission to be the transmission type 2 of MPDSCH transmission. The sending module 703 may be further configured to: after the MPDCCH transmission is configured to be the transmission type 2 of MPDCCH transmission and the MPDSCH transmission is configured to be the transmission type 2 of MPDSCH transmission, send the transmission type 2 of MPDCCH transmission and the transmission type 2 of MPDSCH transmission to the UE, or, in response to that the user capability is support for physical downlink channel transmission in the LTE control channel region of the subframe, send the transmission type 2 of MPDSCH transmission to the UE, configure the MPDCCH transmission to be the transmission type 2 of MPDCCH transmission and, after the MPDCCH transmission is configured to be the transmission type 2 of MPDCCH transmission, send the transmission type 2 of MPDCCH transmission to the LTE.

Figure 9:
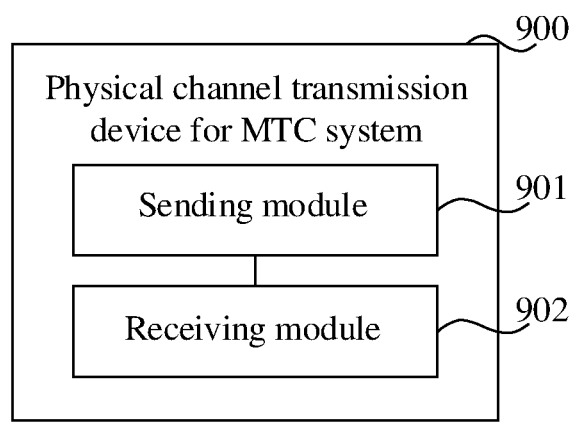
FIG. 9 is a block diagram of another device for physical channel transmission in an MTC system, according to an exemplary embodiment.

FIG. 9 is a block diagram of a device 900 for physical channel transmission in an MTC system, according to an exemplary embodiment. The device 900 is applied to UE, and as shown in FIG. 9, may include: a sending module 901 and a receiving module 902.

The sending module 901 is configured to report user capability information of the UE to a base station, the user capability information indicating a user capability of the UE, wherein the user capability may include: nonsupport for physical downlink channel transmission in a long term evolution (LTE) control channel region of a subframe, or support for physical downlink channel transmission in the LTE control channel region of the subframe.

The receiving module 902 is configured to receive a physical downlink channel transmission sent by the base station, a transmission type of the physical downlink channel transmission corresponding to the user capability and the transmission type including a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

In an embodiment, the receiving module 902 is configured to: receive configuration information indicating the transmission type from the base station; and receive the physical downlink channel transmission according to the transmission type indicated by the configuration information. In response to that the user capability is nonsupport for physical downlink channel transmission in the LTE control channel region of the subframe, the configuration information includes that the transmission type is the transmission type 1 for physical downlink channel transmission; and in response to that the user capability is support for physical downlink channel transmission in the LTE control channel region of the subframe, the configuration information includes that the transmission type is the transmission type 2 for physical downlink channel transmission.

In an embodiment, a physical downlink channel includes an MPDCCH and an MPDSCH, and that the transmission type is the transmission type 2 for physical downlink channel transmission includes that: an MPDCCH transmission is a transmission type 1 of MPDCCH transmission, and an MPDSCH transmission is a transmission type 2 of MPDSCH transmission; or, the MPDCCH transmission is a transmission type 2 of MPDCCH transmission, and the MPDSCH transmission is a transmission type 1 of MPDSCH transmission; or, the MPDCCH transmission is the transmission type 2 of MPDCCH transmission, and the MPDSCH transmission is the transmission type 2 of MPDSCH transmission; or, the MPDCCH transmission is the transmission type 1 of MPDCCH transmission, and the MPDSCH transmission is the transmission type 1 of MPDSCH transmission.

In an embodiment, the receiving module 902 is further configured to, before the user capability information is reported to the base station, receive a broadcast message carrying indication information from the base station, the indication information indicating that a currently accessed MTC system is standalone; and correspondingly, the sending module 901 is configured to: when it is determined according to the indication information in the broadcast message that the MTC system is standalone, report the user capability information to the base station. The broadcast message is a MIB, and the indication information provides an indication through one or more spare bits of the MIB, or, the broadcast message is a SIB.

In an embodiment, the physical downlink channel includes the MPDCCH and the MPDSCH; and the receiving module 902 may be configured to: in response to that the user capability is support for physical downlink channel transmission in the LTE control channel region of the subframe, receive the transmission type 2 of MPDCCH transmission and transmission type 2 of MPDSCH transmission sent by the base station, or, in response to that the user capability is support for physical downlink channel transmission in the LTE control channel region of the subframe, receive a first configuration message indicating that the MPDCCH transmission is configured to be the transmission type 2 of MPDCCH transmission and the MPDSCH transmission is configured to be the transmission type 2 of MPDSCH transmission from the base station. The receiving module 902 may be further configured to: after the first configuration message is received, receive the transmission type 2 of MPDCCH transmission and transmission type 2 of MPDSCH transmission sent by the base station, or, in response to that the user capability is support for physical downlink channel transmission in the LTE control channel region of the subframe, receive the transmission type 2 of MPDSCH transmission and a second configuration message indicating that the MPDCCH transmission is configured to be the transmission type 2 of MPDCCH transmission from the base station and, after the second configuration message is received, receive the transmission type 2 of MPDCCH transmission sent by the base station.

In the above embodiments, the UE reports the user capability information of the UE to the base station, the user capability information indicating the user capability of the UE, wherein the user capability includes that nonsupport for physical downlink channel transmission in the LTE control channel region of the subframe or support for physical downlink channel transmission in the LTE control channel region of the subframe; and the base station, after acquiring the user capability information of the UE, determines the user capability of the UE according to the user capability information to send the physical downlink channel transmission to the UE according to the transmission type corresponding to the user capability, the transmission type including the transmission type 1 for physical downlink channel transmission or the transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe; and the UE receives the physical downlink channel transmission sent by the base station according to the transmission type corresponding to the user capability. Therefore, the present disclosure provides a mechanism for physical downlink channel transmission for an MTC system, which can notify the base station of whether the UE that accesses the current MTC system has a capability of implementing physical downlink channel transmission by use of the LTE control channel region of the subframe, so as to enable the base station to definitely determine whether to occupy the LTE control channel region of the subframe for subsequent transmission of the physical downlink channel transmission.

With respect to the device in the above embodiments, the specific manners for performing operations by individual modules therein have been described in detail in the embodiments regarding the method, which will not be repeated herein.

Figure 10:
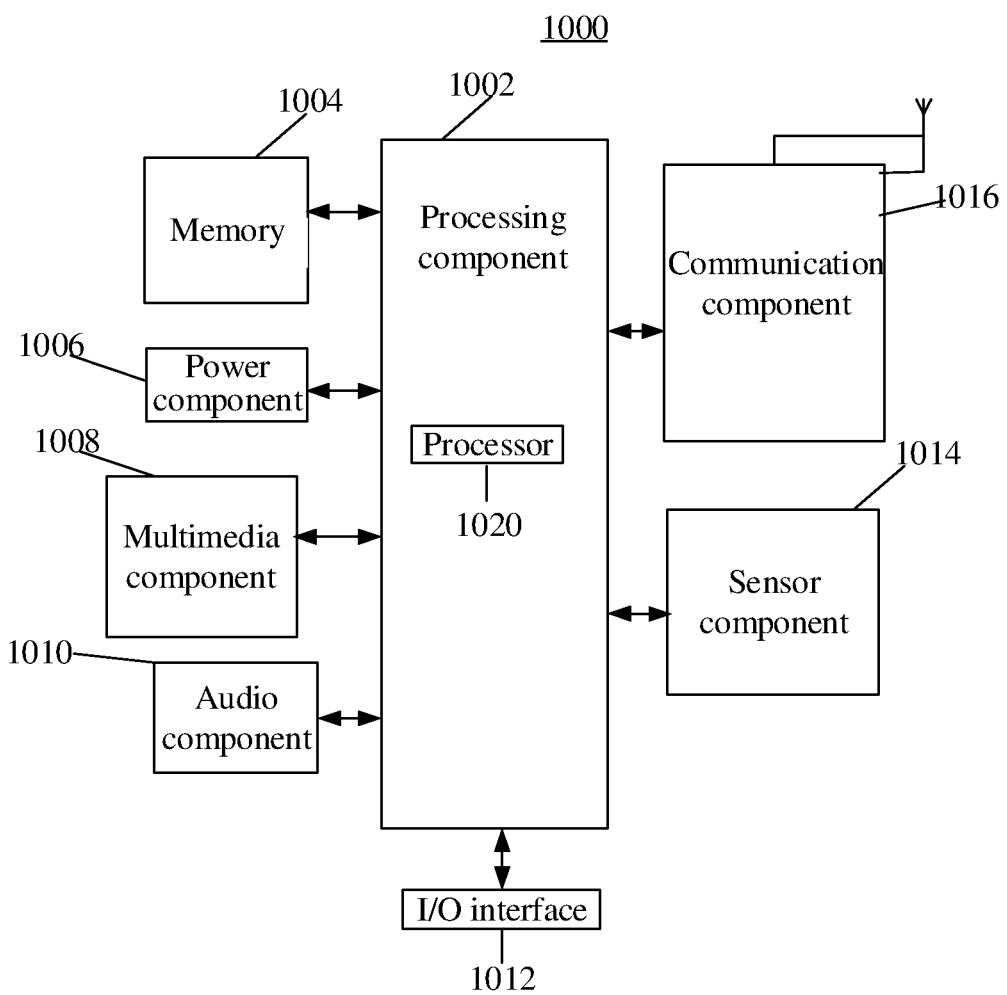
FIG. 10 is a block diagram of another device for physical channel transmission in an MTC system, according to an exemplary embodiment.

FIG. 10 is a block diagram of a device 1000 for physical channel transmission in an MTC system, according to an exemplary embodiment. For example, the device 1000 may be UE, such as a mobile phone, a computer, a digital broadcast terminal, a messaging device, a gaming console, a tablet, a medical device, exercise equipment, a personal digital assistant and the like.

Referring to FIG. 10, the device 1000 may include one or more of the following components: a processing component 1002, a memory 1004, a power component 1006, a multimedia component 1008, an audio component 1010, an Input/Output I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to implement all or part of the steps in the method for physical channel transmission in an MTC system. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 provides power for various components of the device 1000. The power component 1006 may include a power management system, one or more power supplies, and other components associated with generation, management and distribution of power for the device 1000.

The multimedia component 1008 includes a screen providing an output interface between the device 1000 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1008 includes a front camera and/or a rear camera. The front camera and/or the rear camera may receive external multimedia data when the device 1000 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a Microphone (MIC), and the MIC is configured to receive an external audio signal when the device 1000 is in the operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

The I/O interface 1012 provides an interface between the processing component 1002 and a peripheral interface module, and the peripheral interface module may be a keyboard, a click wheel, a button and the like. The button may include, but not limited to: a home button, a volume button, a starting button and a locking button.

The sensor component 1014 includes one or more sensors configured to provide status assessment in various aspects for the device 1000. For instance, the sensor component 1014 may detect an on/off status of the device 1000 and relative positioning of components, such as a display and small keyboard of the device 1000, and the sensor component 1014 may further detect a change in a position of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include a light sensor, such as a Complementary Metal Oxide Semiconductor (CMOS) or Charge Coupled Device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and another device. The device 1000 may access a communication-standard-based wireless network, such as a Wireless Fidelity (WiFi) network, a 4th-Generation (4G) or 5th-Generation (5G) network or a combination thereof. In an exemplary embodiment, the communication component 1016 receives a broadcast signal or broadcast associated information from an external broadcast management system through a broadcast channel. In an exemplary embodiment, the communication component 1016 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method for physical channel transmission in an MTC system.

In an exemplary embodiment, there is also provided a non-transitory computer-readable storage medium including instructions, such as the memory 1004 including instructions, and the instructions may be executed by the processor 1020 of the device 1000 to perform the method for physical channel transmission in an MTC system. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 11:
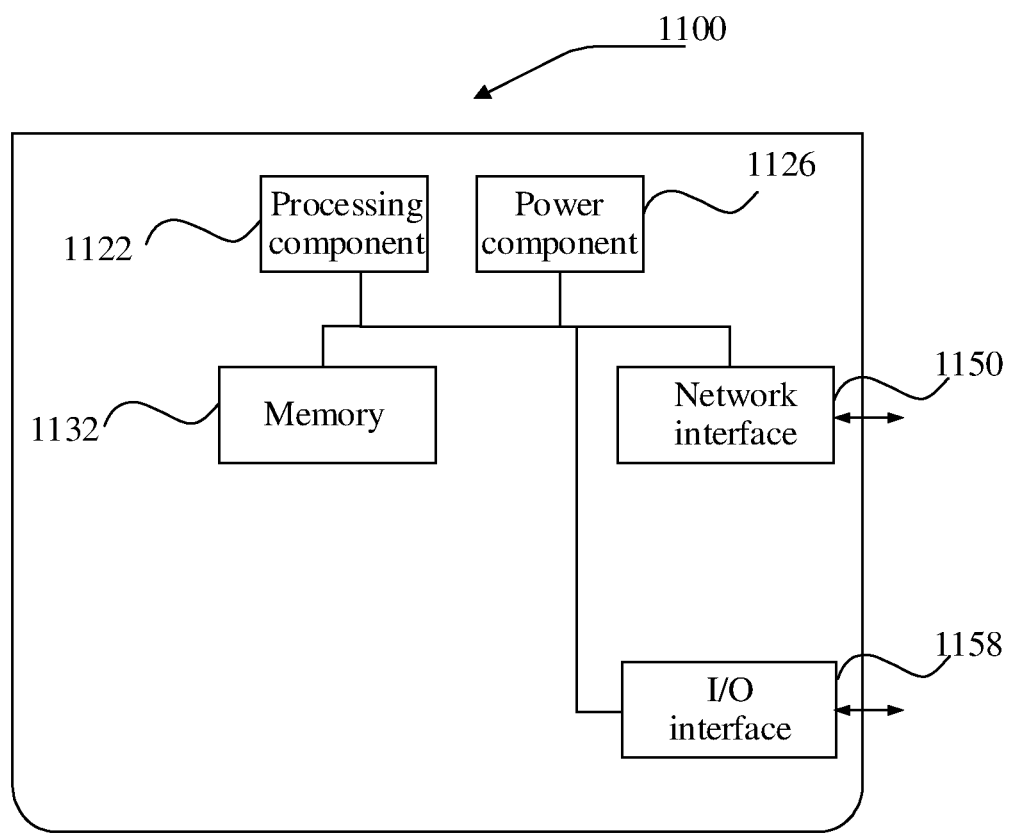
FIG. 11 is a block diagram of another method for physical channel transmission in an MTC system, according to an exemplary embodiment.

FIG. 11 is a block diagram of a device 1100 for physical channel transmission in an MTC system, according to an exemplary embodiment. For example, the device 1100 may be provided as a server or a base station. Referring to FIG. 11, the device 1100 includes a processing component 1122, further including one or more processors, and a memory resource represented by a memory 1132, configured to store instructions executable for the processing component 1122, for example, an application program. The application program stored in the memory 1132 may include one or more than one module of which each corresponds to a set of instructions. In addition, the processing component 1122 is configured to execute the instructions to perform the above-described method for physical channel transmission in an MTC system.

The device 1100 may further include a power component 1126 configured to perform power management of the device 1100, a wired or wireless network interface 1150 configured to connect the device 1100 to a network, and an I/O interface 1158. The device 1100 may be operated based on an operating system stored in the memory 1132, for example, Windows Server™, Mac OS X™, Unix™, Linux™, FreeBSD™ or the like.

Figure 12:
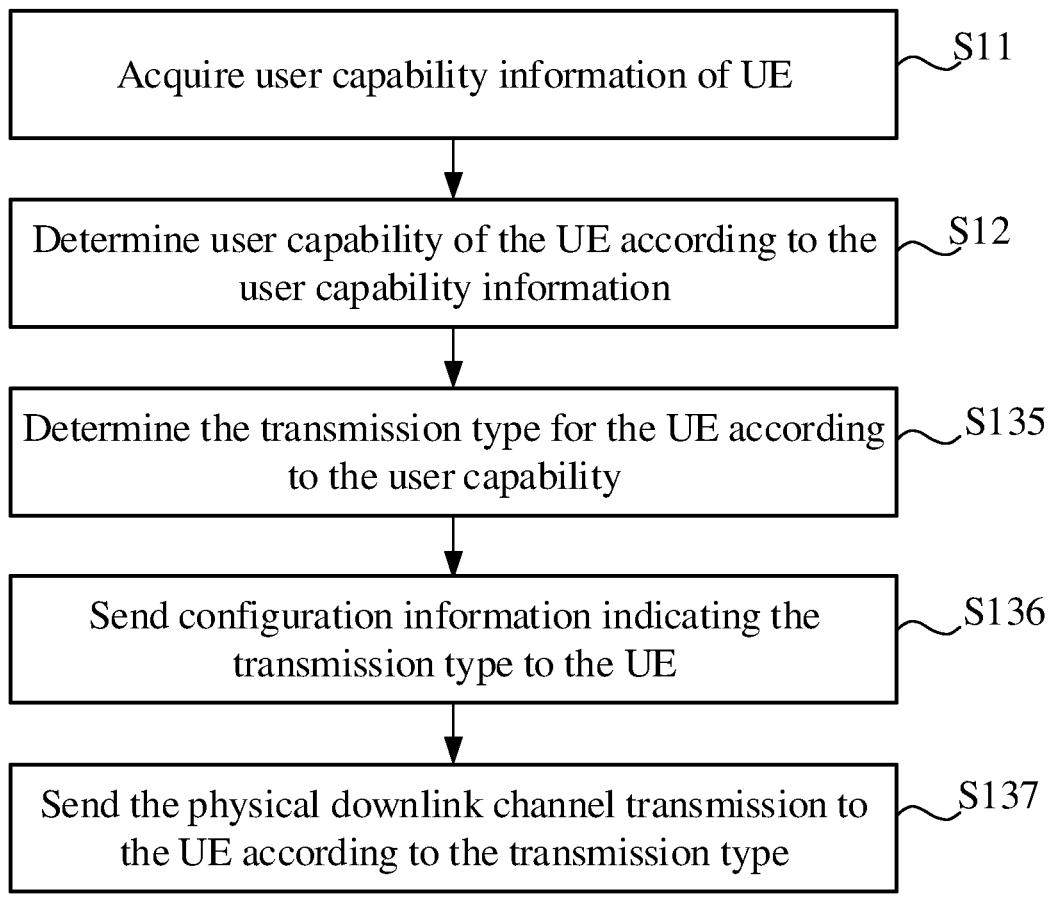
FIG. 12 is a flow chart showing another method for physical channel transmission in an MTC system, according to an exemplary embodiment.

FIG. 12 is a flow chart showing a method for physical channel transmission in an MTC system, according to an exemplary embodiment. The method is applied to a base station. As shown in FIG. 12, the operation in S13 (FIG. 1) that the physical downlink channel transmission is sent to the UE according to the transmission type corresponding to the user capability may include the following steps.

In S135, the transmission type is determined for the UE according to the user capability.

The transmission type may be configured for the UE according to the user capability by: in response to that the user capability is nonsupport for physical downlink channel transmission in the LTE control channel region of the subframe, the transmission type is configured to be the transmission type 1 for physical downlink channel transmission; and in response to that the user capability is support for physical downlink channel transmission in the LTE control channel region of the subframe, the transmission type is configured to be the transmission type 2 for physical downlink channel transmission.

Since the physical downlink channel includes the MPDCCH and the MPDSCH, independent configuration or joint configuration is performed on the MPDCCH and the MPDSCH. Independent configuration may be understood that the MPDCCH and the MPDSCH are independently configured and the MPDCCH transmission and the MPDSCH may be of different types. Joint configuration may be understood that the MPDCCH and the MPDSCH may be configured at one time, namely the MPDCCH transmission and the MPDSCH transmission are of the same type. Therefore, the step of configuring the transmission type to be the type 2 physical downlink channel in response to that the user capability is support for physical downlink channel transmission in the LTE control channel region of the subframe may include the following conditions.

For independent configuration, the MPDCCH transmission is configured to be the transmission type 1 of MPDCCH transmission, and the MPDSCH transmission is configured to be the transmission type 2 of MPDSCH transmission; or, the MPDCCH transmission is configured to be the transmission type 2 of MPDCCH transmission, and the MPDSCH transmission is configured to be the transmission type 1 of MPDSCH transmission.

For joint configuration, the MPDCCH transmission is configured to be the transmission type 2 of MPDCCH transmission, and the MPDSCH transmission is configured to be the transmission type 2 of MPDSCH transmission; or, the MPDCCH transmission is configured to be the transmission type 1 of MPDCCH transmission, and the MPDSCH transmission is configured to be the transmission type 1 of MPDSCH transmission.

For example, when the user capability is support for physical downlink channel transmission in the LTE control channel region of the subframe, types of both the MPDCCH transmission and the MPDSCH transmission are configured to be type 2 to fully utilize the LTE control channel region of the subframe when the MPDCCH transmission and the MPDSCH transmission are subsequently transmitted, or, the type of at least one of the MPDCCH transmission and the MPDSCH transmission may still be set to be type 1 when necessary.

In S136, configuration information indicating the transmission type is sent to the UE.

In S137, the physical downlink channel transmission is sent to the UE according to the transmission type.

After the determination in S135, the configuration information is sent to the UE to notify the types of the MPDCCH transmission and MPDSCH transmission that are subsequently transmitted, and then the MPDCCH transmission or the MPDSCH transmission is sent according to the type of the MPDCCH transmission or the type of the MPDSCH transmission determined in S135, such that the UE also receive the MPDCCH transmission or the MPDSCH transmission according to the type of the MPDCCH transmission or the type of the MPDSCH transmission determined in S135.

In addition, when the physical downlink channel transmission is to be sent, it is determined whether the physical downlink channel transmission to be sent is a dedicated message of the UE or a message shared among multiple UEs (including the UE). If the message to be sent is a dedicated message, the physical downlink channel transmission is sent according to the transmission type determined in S135. When the message to be sent is a shared message, the physical downlink channel transmission is still sent according to type 1.

For example, when the MPDCCH transmission or MPDSCH transmission to be sent is a dedicated message of the UE, such as a control message, data or service information to be sent to the UE, the MPDCCH transmission or the MPDSCH transmission is sent according to the type of the MPDCCH transmission or the type of the MPDSCH transmission determined in S135. When the MPDCCH transmission or MPDSCH transmission to be sent is a message shared among multiple UEs, such as a system message and a paging message, the MPDCCH transmission or the MPDSCH transmission may still be sent according to the transmission type 1 of MPDCCH transmission or the transmission type 1 of MPDSCH transmission.

Figure 13:
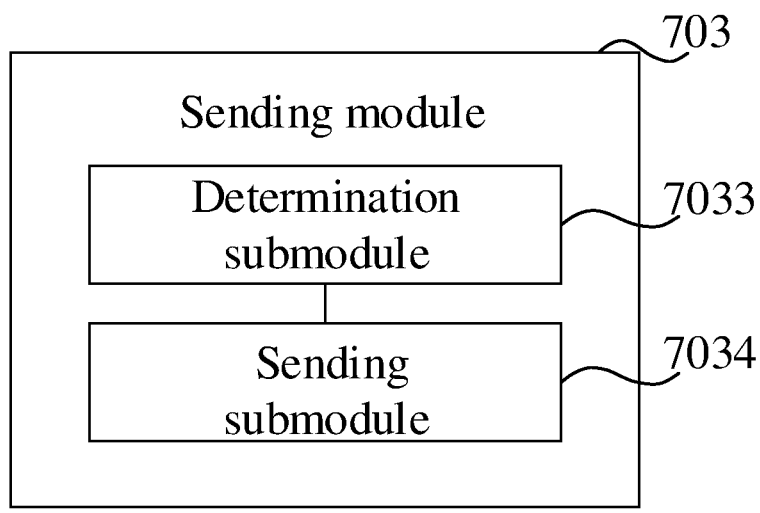
FIG. 13 is a block diagram of a sending module, according to an exemplary embodiment.

FIG. 13 is a block diagram of the sending module 703 (FIG. 7), according to an exemplary embodiment shown in FIG. 7. As shown in FIG. 13, the sending module 703 may include: a determination submodule 7033 configured to determine the transmission type for the LTE according to the user capability: and a sending submodule 7034 configured to send configuration information indicating the transmission type to the UE, wherein the sending submodule 7034 is further configured to send the physical downlink channel transmission to the UE according to the transmission type.

In an embodiment, the sending submodule 7034 is configured to: in response to that the user capability is nonsupport for physical downlink channel transmission in the LTE control channel region of the subframe, configure the transmission type to be the transmission type 1 for physical downlink channel transmission; and in response to that the user capability is support for physical downlink channel transmission in the LTE control channel region of the subframe, configure the transmission type to be the transmission type 2 for physical downlink channel transmission.

In an embodiment, a physical downlink channel includes an MPDCCH and an MPDSCH; and the sending submodule 7034 may be configured to: in response to that the user capability is support for physical downlink channel transmission in the LTE control channel region of the subframe, configure an MPDCCH transmission to be a transmission type 1 of MPDCCH transmission and configure an MPDSCH transmission to be a transmission type 2 of MPDSCH transmission, or configure the MPDCCH transmission to be a transmission type 2 of MPDCCH transmission and configure the MPDSCH transmission to be a transmission type 1 of MPDSCH transmission, or configure the MPDCCH transmission to be the transmission type 2 of MPDCCH transmission and configure the MPDSCH transmission to be the transmission type 2 of MPDSCH transmission, or configure the MPDCCH transmission to be the transmission type 1 of MPDCCH transmission and configure the MPDSCH transmission to be the transmission type 1 of MPDSCH transmission.

In an embodiment, the physical downlink channel includes the MPDCCH and the MPDSCH; and the sending module 703 may be configured to: in response to that the user capability is support for physical downlink channel transmission in the LTE control channel region of the subframe, send the transmission type 2 of MPDCCH transmission and the transmission type 2 of MPDSCH transmission to the UE, or, in response to that the user capability is support for physical downlink channel transmission in the LTE control channel region of the subframe, configure the MPDCCH transmission to be the transmission type 2 of MPDCCH transmission, configure the MPDSCH transmission to be the transmission type 2 of MPDSCH transmission. The sending module 703 may be further configured to: after the MPDCCH transmission is configured to be the transmission type 2 of MPDCCH transmission and the MPDSCH transmission is configured to be the transmission type 2 of MPDSCH transmission, send the transmission type 2 of MPDCCH transmission and the transmission type 2 of MPDSCH transmission to the LTE, or, in response to that the user capability is support for physical downlink channel transmission in the LTE control channel region of the subframe, send the transmission type 2 of MPDSCH transmission to the LTE, configure the MPDCCH transmission to be the transmission type 2 of MPDCCH transmission and, after the MPDCCH transmission is configured to be the transmission type 2 of MPDCCH transmission, send the transmission type 2 of MPDCCH transmission to the UE.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for physical channel transmission in a machine type communication (MTC) system, applied to a base station, and the method comprising:
   acquiring user capability information of user equipment (UE); determining a user capability of the UE according to the user capability information, the user capability comprising: nonsupport for physical downlink channel transmission in a long term evolution (LTE) control channel region of a subframe, or support for physical downlink channel transmission in the LTE control channel region of the subframe; and
   sending a physical downlink channel transmission to the UE according to a transmission type corresponding to the user capability, the transmission type comprising a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

2. The method of claim 1, wherein the sending the physical downlink channel transmission to the UE according to the transmission type corresponding to the user capability comprises:
   determining the transmission type for the UE according to the user capability;
   sending configuration information indicating the transmission type to the UE; and
   sending the physical downlink channel transmission to the UE according to the transmission type.

3. The method of claim 2, wherein the determining transmission type for the UE according to the user capability comprises:
   configuring the transmission type to be the transmission type 1 for physical downlink channel transmission, in response to that the user capability is nonsupport for physical downlink channel transmission in the LTE control channel region of the subframe; and configuring the transmission type to be the transmission type 2 for physical downlink channel transmission, in response to that the user capability is support for physical downlink channel transmission in the LTE control channel region of the subframe.

4. The method of claim 1, wherein the acquiring the user capability information of the UE comprises one of:

receiving the user capability information reported by the UE; or acquiring the user capability information from a mobility management entity (MME).

5. The method of claim 1, wherein the acquiring the user capability information of the UE comprises:

acquiring the user capability information reported by the UE after receiving a broadcast message.

6. The method of claim 5, wherein the broadcast message is one of a master information block (MIB) or a system information block (SIB), wherein when broadcast message is the MIB, the indication information provides an indication through one or more spare bits of the MIB.

7. A method for physical channel transmission in a machine type communication (MTC) system, applied to user equipment (UE), and the method comprising:

reporting user capability information of the UE to a base station, the user capability information indicating a user capability of the UE, wherein the user capability comprises: nonsupport for physical downlink channel transmission in a long term evolution (LTE) control channel region of a subframe, or support for physical downlink channel transmission in the LTE control channel region of the subframe; and receiving a physical downlink channel transmission sent by the base station, a transmission type of the physical downlink channel transmission corresponding to the user capability, and the transmission type comprising a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

8. The method of claim 7, wherein receiving the physical downlink channel transmission sent by the base station comprises:

receiving, from the base station, configuration information indicating the transmission type; and receiving the physical downlink channel transmission according to the transmission type indicated by the configuration information.

9. The method of claim 8, wherein:

in response to that the user capability is nonsupport for physical downlink channel transmission in the LTE control channel region of the subframe, the configuration information comprises: the transmission type being the transmission type 1 for physical downlink channel transmission; and in response to that the user capability is support for physical downlink channel transmission in the LTE control channel region of the subframe, the configuration information comprises: the transmission type being the transmission type 2 for physical downlink channel transmission.

10. The method of claim 7, further comprising:

receiving, from the base station, a broadcast message carrying indication information, the indication information indicating that the MTC system is standalone, wherein the reporting the user capability information of the UE to the base station comprises:

in response to determining according to the indication information in the broadcast message that the MTC system is standalone, reporting the user capability information to the base station.

11. The method of claim 7, wherein the physical downlink channel comprises an MTC physical downlink control channel (MPDCCH) and an MTC physical downlink shared channel (MPDSCH), and the receiving the physical downlink channel transmission sent by the base station comprises one of:

in response to that the user capability is support for physical downlink channel transmission in the LTE control channel region of the subframe, receiving the transmission type 2 of MPDCCH transmission and transmission type 2 of MPDSCH transmission sent by the base station.; or in response to that the user capability is support for physical downlink channel transmission in the LTE control channel region of the subframe, receiving a first configuration message from the base station, the first configuration message indicating that the MPDCCH transmission is to be configured to be the transmission type 2 of MPDCCH transmission, and the MPDSCH transmission is to be configured to be the transmission type 2 of MPDSCH transmission, and after the first configuration message is received, receiving the transmission type 2 of MPDCCH transmission and transmission type 2 of MPDSCH transmission sent by the base station; or in response to that the user capability is support for physical downlink channel transmission in the LTE control channel region of the subframe, receiving the transmission type 2 of MPDSCH transmission and a second configuration message indicating that the MPDCCH transmission is to be configured to be the transmission type 2 of MPDCCH transmission from the base station, and after the second configuration message is received, receiving the transmission type 2 of MPDCCH transmission sent by the base station.

12. A base station for use in a machine type communication (MTC) system, comprising:

a processor; and a memory configured to store instructions executable by a processor, wherein the processor is configured to perform the method of claim 1.

13. The base station of claim 12, wherein the processor is further configured to:

determine the transmission type for the UE according to the user capability;

send configuration information indicating the transmission type to the UE, and send the physical downlink channel transmission to the UE according to the transmission type.

14. The base station of claim 13, wherein the processor is further configured to:

in response to that the user capability is nonsupport for physical downlink channel transmission in the LTE control channel region of the subframe, configure the transmission type to be the transmission type 1 for physical downlink channel transmission; and in response to that the user capability is support for physical downlink channel transmission in the LTE control channel region of the subframe, configure the transmission type to be the transmission type 2 for physical downlink channel transmission.

15. The base station of claim 12, wherein the processor is further configured to perform one of:
receiving the user capability information reported by the UE; or
acquiring the, user capability information from a mobility management entity (MME).

16. The base station of claim 12, wherein the processor is further configured to:
acquire the user capability information reported by the UE after receiving a broadcast message.

17. User equipment (UE) for use in a Machine Type Communication (MTC) system, comprising:
a processor; and
a memory configured to store instructions executable by a processor,
wherein the processor is configured to:
report user capability information of the UE to a base station, the user capability information indicating a user capability of the UE, wherein the user capability comprises: nonsupport for physical downlink channel transmission in a long term evolution (LTE) control channel region of a subframe, or support for physical downlink channel transmission in the LTE control channel region of the subframe; and
receive a physical downlink channel transmission sent by the base station, a transmission type of the physical downlink channel transmission corresponding to the user capability, and the transmission type comprising a transmission type 1 for physical downlink channel transmission or a transmission type 2 for physical downlink channel transmission, wherein for the transmission type 1, the physical downlink channel transmission is not sent in the LTE control channel region of the subframe, and for the transmission type 2, the physical downlink channel transmission is sent in the LTE control channel region of the subframe.

18. The UE of claim 17, wherein the processor is further configured to:
receive, from the base station, configuration information indicating the transmission type; and
receive the physical downlink channel transmission according to the transmission type indicated by the configuration information.

19. The UE of claim 18, wherein:
in response to that the user capability is nonsupport for physical downlink channel transmission in the LTE control channel region of the subframe, the configuration information comprises the transmission type being the transmission type 1 for physical downlink channel transmission; and
in response to that the user capability is support for physical downlink channel transmission in the LTE control channel region of the subframe, the configuration information comprises the transmission type being the transmission type 2 for physical downlink channel transmission.

20. The LTE of claim 17, wherein the processor is further configured to:
receive a broadcast message carrying indication information from the base station, the indication information indicating that the MTC system is standalone; and
in response to determining according to the indication information in the broadcast message that the MTC system is standalone, report the user capability information to the base station.

* * * * *